Patented Sept. 7, 1937

2,092,525

UNITED STATES PATENT OFFICE 2,092,525

HYDROGENATION OF PRIMARY AROMATIC AMINES

Homer Adkins, Madison, Wis., and Howard I. Cramer, Cuyahoga Falls, Ohio

No Drawing. Application June 27, 1932, Serial No. 619,525

8 Claims. (Cl. 260—130.5)

This invention relates to a process for the hydrogenation of aromatic amines and, more particularly, to the hydrogenation of the difficultly reducible primary aromatic amines, such as aniline and toluidine. Among other things, the invention provides a process whereby aromatic amines may be hydrogenated in the liquid phase, at lower temperatures and pressures, and in much higher yields than heretofore possible. Further, the products are obtained in comparatively pure form containing negligible amounts, if any, of the undesirable byproducts formed in the prior art processes.

Heretofore, primary aromatic amines such as aniline have been reduced only in the vapor phase over a nickel catalyst, cyclohexylamine, one of several products, being obtained in a yield of only about thirty percent. Also, aniline has been hydrogenated by Ipatiev, Berichte, volume 41, page 993 (1908), using a nickel oxide catalyst. He found that 50 hours were required when working at a temperature of 220 degrees and a pressure of 215 atmospheres. The product was composed of 40–50% cyclohexylamine, 10% dicyclohexylamine and some cyclohexyl aniline.

This invention resides in the discovery that by working in the liquid phase and using an improved nickel catalyst, primary aromatic amines may be hydrogenated to comparatively pure products in yields as high as 99%. The temperature required will in general range from 175° to 250° C. and the pressure, from 100 to 250 atmospheres. The reaction proceeds to completion in as short a time as 3 to 9 hours with the bulk of the hydrogenation requiring only one hour.

The preferred nickel catalyst employed in this invention, described more fully in the patent application of Homer Adkins, Serial No. 616,093, filed June 8, 1932, is prepared by levigating a foraminous carrier containing a soluble nickel salt, adding to the levigate a basic carbonate, and reducing the resulting precipitated nickel carbonate. In the preparation of the catalyst, 100 parts by weight of nitric acid washed kieselguhr are mixed with a solution comprising 100 parts of nickel nitrate hexahydrate in 150 parts of water. The resulting mixture is subjected to a process of levigation, as by grinding in a mortar, ball mill or other suitable apparatus, until it attains a cream-like consistency. This cream-like paste is then carefully heated to 70–80 degrees C., meanwhile stirring thoroughly. To the mass is then added a basic carbonate, preferably sodium bicarbonate, heated to a temperature of 70–80 degrees C. The sodium bicarbonate is added in the form of a solution of 60 parts of the bicarbonate in about 500 parts of water. The solution is added gradually until the addition of the carbonate has been completed after which the mixture is vigorously stirred to insure homogeneity. In order to segregate the solid constituents of the mass from the liquid constituents, the mass is then filtered. The filter cake is preferably washed on the filter with four portions each comprising 75 parts of water and is then twice suspended in 300 parts of water.

The moist cake of impregnated kieselguhr is then broken up and dried at 100–110 degrees C. The dried material will be found to be in the neighborhood of 130 parts and to analyze 14 to 15 percent nickel. The active catalyst is prepared from the dried filter cake by reducing the impregnated kieselguhr in a stream of hydrogen or other reducing gas, such as methanol or ethanol vapor or carbon monoxide, at temperatures in the neighborhood of 425–475 degrees C. for a period of 60 to 80 minutes. The resulting product is a dark brown or black free-flowing pyrophoric powder which should be kept out of contact with the atmosphere and should preferably be used as soon as possible after being prepared.

Likewise other nickel catalysts prepared by methods such as the following may be used: (1) the reduction of any nickel salt, either supported or unsupported, by hydrogen or other reducing agents; (2) the treatment of a nickel-alloy such as Ni-Al or Ni-Si, with aqueous alkalis; (3) the reduction of nickel salts in admixture with salts of other metals of Groups VIII or I of Mandelejeff's periodic table acting as cocatalysts; (4) the reduction of nickel salts mixed with promoters such as oxides of the metals of Groups II, III, IV, V and VI of the periodic table; (5) mechanical subdivision of massive nickel; (6) anodic oxidation of nickel surfaces followed by reduction; (7) colloidal dispersion of metallic nickel; and (8) precipitation by more electropositive metals, such as aluminum and zinc.

The following examples illustrate the use of these nickel catalysts in the process of the present invention.

Example 1

One half mol. of aniline was treated with hydrogen under a pressure of 150 to 240 atmospheres over approximately 2 grams of a nickel kieselguhr catalyst prepared as described above, at 175 degrees C. for 5 to 8 hours in a shaking autoclave. The product on fractional distillation gave about 45% of cyclohexylamine, boiling point 133.5 degrees C. at 740 mm., 5 to 10% dicyclohexylamine, and 25% of recovered aniline. The yield of cyclohexylamine corrected for mechanical losses and for the aniline recovered was approximately 80%.

*Example 2*

150 grams of aniline were treated in a shaking autoclave with hydrogen at 100–150 atmospheres over 15 grams of a nickel kieselguhr catalyst prepared according to the detailed process described above except that $(NH_4)_2CO_3.H_2O$ was used as the precipitant in place of sodium bicarbonate. After heating at 250 degrees C. for one hour, the bulk of the hydrogen absorption was complete. At the end of three hours the product on fractional distillation gave a 33% yield of cyclohexylamine and a 66% yield of dicyclohexylamine. At a temperature of 250 degrees C., twice as much dicyclohexylamine as monocyclohexylamine is obtained.

*Example 3*

In another test 150 grams of aniline were treated with hydrogen over 15 grams of the nickel kieselguhr catalyst used in Example 1 under a working pressure of 100–150 atmospheres at 200 degrees C. for 9–10 hours. At this temperature approximately 64% of cyclohexylamine and about 22% of dicyclohexylamine were obtained. It has been noted that when working at about 200 degrees C. the mono cyclohexylamine and the dicyclohexylamine are formed in the proportion of 3 to 1, respectively, whereas at 250 degrees C. the proportion of monocyclohexylamine to dicyclohexylamine obtained is 1 to 2 respectively.

*Example 4*

1 mol. of aniline in 100 ml. of methyl cyclohexane at 175 degrees C. and under a pressure ranging from 200 to 250 atmospheres absorbed about 3 mols of hydrogen when treated with hydrogen in a shaking autoclave in the presence of the above described nickel kieselguhr catalyst for about 9 hours. A 71% yield of cyclohexylamine, boiling point 133.5 degrees C. at 740 mm., was obtained from the product on fractional distillation.

*Example 5*

14 grams of beta naphthylamine dissolved in 35 ml. of methyl cyclohexane were hydrogenated over a reduced nickel-kieselguhr catalyst at 140 degrees C. and 160–200 atmospheres pressure for five hours. A 71% yield of a mixture of aryl and alicyclic tetrahydro naphthylamines, a liquid boiling at 143–147 degrees C. at 15 mm., was obtained.

*Example 6*

In still another test 61 grams of benzidine dissolved in 150 ml. of methyl cyclohexane were treated with hydrogen over a reduced nickel-kieselguhr catalyst prepared as described above, at 175 degrees C. and 150–200 atmospheres pressure for ten hours. A liquid hydrogenated product, boiling point 190–225 degrees C. at 8–9 mm., was obtained in approximately a 60% yield, coinciding with the amount of hydrogen absorbed, also in the neighborhood of 60% of the theoretical.

Other primary aromatic amines may be used with equally successful results in this improved process, examples being ortho, meta and para toluidine; the xylidenes; alpha naphthylamine; ortho ethyl phenyl amine; tolidine; para ethyl phenyl amine; the butyl phenyl amines; and the cumidyl phenyl amines. With amines which are solid at ordinary temperatures, it will be found preferable to dissolve the same in an inert solvent, such as methyl cyclohexane and decahydro naphthalene. Any other saturated hydrocarbon in which the amine will dissolve and which is not decomposed at the comparatively low temperatures of the reaction may also be used. If desired, liquid amines may be hydrogenated in the presence of these same solvents, although there is ordinarily nothing to gain by doing so.

It is readily seen that this invention provides a process greatly improved over those of the prior art. Among other things, the reactions involved proceed to completion in a comparatively short time in only a single step. Excellent yields containing negligible amounts, if any, of undesirable byproducts are obtained. Even the difficultly reducible aniline is hydrogenated in almost a quantitative yield. The reaction is operative at comparatively low temperatures. Further, the results obtained may be easily duplicated from one run to the next.

Although only the preferred forms of the invention have been described, it is to be understood that the invention is not limited thereby, other primary aromatic amines than those described constituting a part of the present invention. Also various, minor modifications may be made without departing from the spirit of the invention or the scope of the appended claims. It is intended that the patent shall cover, by suitable expression in the appended claims, whatever features of patentable novelty reside in the invention.

What is claimed is:

1. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating a carrier having associated therewith a soluble nickel compound, adding to the levigate a basic carbonate and reducing the resulting precipitated nickel carbonate.

2. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating kieselguhr having associated therewith a soluble nickel compound, adding to the levigate a basic carbonate and reducing the resulting precipitated nickel carbonate.

3. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating a carrier having associated therewith nickel nitrate, adding to the levigate a basic carbonate and reducing the resulting precipitated nickel carbonate.

4. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating a foraminous carrier having associated therewith a soluble nickel compound, adding to the levigate an alkali metal bicarbonate and reducing the resulting precipitated nickel carbonate.

5. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating kieselguhr having associated therewith nickel nitrate, adding to the levigate a basic carbonate and reducing the resulting precipitated nickel carbonate.

6. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating kieselguhr having associated therewith nickel nitrate, adding to the levigate an alkali metal bicarbonate and reducing the resulting precipitated nickel carbonate.

7. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by levigating kieselguhr having associated therewith a liquid dispersion of nickel nitrate, adding to the levigate a sodium bicarbonate and reducing the resulting precipitated nickel carbonate.

8. A process of preparing cyclohexyl amine which comprises treating aniline in the liquid phase with hydrogen under superatmospheric pressures and at temperatures between approximately 175 degrees C. and approximately 250 degrees C. in the presence of a reduced nickel catalyst prepared by grinding acid-washed kieselguhr in the presence of an equal quantity of nickel nitrate hexahydrate, said nickel nitrate hexahydrate being dissolved in water; heating the resulting mass to a temperature in the neighborhood of 70-80 degrees C.; precipitating the nickel as a basic carbonate by adding sodium bicarbonate in approximately two-thirds the amount of the nickel nitrate hexahydrate employed, said sodium bicarbonate being added in solution; separating the kieselguhr and the basic nickel carbonate from the other constituents of the mass by filtering, and reducing the basic nickel carbonate from the other constituents of the mass by filtering, and reducing the basic nickel carbonate to nickel in situ upon the kieselguhr.

HOMER ADKINS.
HOWARD I. CRAMER.